United States Patent [19]

Maeoka

[11] Patent Number: 4,548,027
[45] Date of Patent: Oct. 22, 1985

[54] COMBINE HARVESTER

[75] Inventor: Kazuyuki Maeoka, Sakai, Japan

[73] Assignee: Kubota, Ltd., Osaka, Japan

[21] Appl. No.: 586,915

[22] Filed: Mar. 7, 1984

[30] Foreign Application Priority Data

| Nov. 11, 1983 | [JP] | Japan | 58-212889 |
| Nov. 11, 1983 | [JP] | Japan | 58-212890 |
| Nov. 14, 1983 | [JP] | Japan | 58-213744 |
| Nov. 14, 1983 | [JP] | Japan | 58-213745 |
| Nov. 17, 1983 | [JP] | Japan | 58-216833 |

[51] Int. Cl.$^4$ .................. A01D 41/00; A01F 12/00
[52] U.S. Cl. .................. 56/10.2; 56/DIG. 15
[58] Field of Search .................. 56/10.2, DIG. 15

[56] References Cited

U.S. PATENT DOCUMENTS

| 3,466,854 | 9/1969 | Ashton et al. | 56/DIG. 15 |
| 3,606,742 | 9/1971 | Wieneke et al. | 56/DIG. 15 |
| 3,606,745 | 9/1971 | Girodat | 56/DIG. 15 |
| 3,659,618 | 5/1972 | Kobald et al. | 56/DIG. 15 |
| 3,935,866 | 2/1976 | Northrup et al. | 56/DIG. 15 |
| 3,999,359 | 12/1976 | Jordan et al. | 56/DIG. 15 |
| 4,130,980 | 12/1978 | Fardal et al. | 56/DIG. 15 |
| 4,188,772 | 2/1980 | Jordan et al. | 56/DIG. 15 |
| 4,458,471 | 7/1984 | Herwig | 56/DIG. 15 |

Primary Examiner—Paul J. Hirsch
Attorney, Agent, or Firm—Edwin E. Greigg

[57] ABSTRACT

There is disclosed a combine harvester in which a traveling change speed mechanism is automatically controlled in response to workload variations in order to maintain the workload within a predetermined range. In normal circumstances, controls are effected on the basis of an average value of deviations from a control target value of values of the load sampled a predetermined number of times. A change speed operation is immediately effected in an amount corresponding to the deviations when a difference between a value of variation of the sampled values from sampled values obtained a previous time from sampled values obtained earlier is greater than a predetermined value.

6 Claims, 15 Drawing Figures

1

COMBINE HARVESTER

BACKGROUND OF THE INVENTION

This invention relates to a combine harvester, and more particularly to a combine harvester having control means to automatically shift a traveling change speed mechanism in response to sampled load variations occurring on an engine in order to maintain workloads within a predetermined range.

It is known in the art that this type of combine harvester is constructed so as to travel at controlled speeds according to load variations in order to maintain the workloads within a predetermined range. However, according to the prior art construction, such controls are effected to shift the change speed mechanism immediately in response to sampled results of the load variations, which has the following disadvantages:

Although ordinary operations are relatively free from great load variations, it is often the case to constantly load variations occurring at random which are due to changes in conditions of a field where the operations are conducted, vibrations of the harvester body and the like. Controls involving constant change speed operations in response to such temporary load variations must operate an actuator with great frequency to a disadvantage of shortened life thereof.

It is conceivable to average values of load variations sampled by a predetermined cycle time, to avoid responses to temporary load variations or load variations occurring at randon. However, a control mode for effecting speed changes on the basis of the average of detected load variation values is incapable of effectively coping with abrupt load variations though it is adequate to cope with gentle load variations.

It is impossible to promptly follow such abrupt load variations because of a small amount of change speed operation or a slow action which is based on the averaged amount of load variations.

On the other hand, the known combine harvester as described above which is the type to control the workload by changing its traveling speed has another problem, as follows:

Whether the traveling speed is controlled automatically or manually is determined by the driver in advance, and necessary control parameters are obtained after the automatic control mode is selected. Therefore, a change to the automatic control mode is not effected smoothly when a load condition at a time of hand-operated driving during an idle time greatly differs from an optimal load condition for a working implement by the automatic control. In other words, a sudden acceleration or deceleration may occur inadvertently, which is dangerous, when starting the automatic control, since a control parameter remains undetected then.

In one type of conventional combine harvester, the traveling speed is automatically controlled by operating only an auxiliary change speed mechanism when reaping grain-carrying stalks lying down on the ground, whereas the traveling speed is controlled by operating a main change speed mechanism according to workloads when reaping upstanding stalks. When at this time data indicating low speed traveling is input into a control system, it is impossible to determine whether the input data is due to the operation of the auxiliary change speed mechanism or to an actual increase in the workload. In other words, correct controls cannot be effected on the traveling speed when reaping upstanding stalks rather than lying stalks.

In addition, when insensitivity zones are provided adjacent a control target value, controls outwardly of the insensitivity zones tend to be unsatisfactory, contrary to what one would expect.

Further, it has been an inevitable drawback of the conventional combine harvester that a sudden change in the load which takes place at a start or end of the reaping operation disturbs the traveling speed controls.

SUMMARY OF THE INVENTION

This invention has been made having regard to the above state of the art. A primary object of this invention, therefore, is to provide a combine harvester having traveling speed control means to promptly respond to and follow sudden or abrupt load variations in an excellent manner and yet make no response to load variations of the random nature.

Another object of the invention is to provide a combine harvester having, in addition to the above feature, means to smoothly switch from a manual control mode to an automatic control mode.

A further object of the invention is to provide a combine harvester having, in addition to the above feature, means, a main change speed mechanism and an auxiliary change speed mechanism are provided, to automatically shift the former according to a change speed ratio provided by the latter.

In order to achieve the above objects, a combine harvester according to all embodiments of this invention is constructed that shift controls are in normal circumstances effected on the main change speed mechanism on the basis of an average value of deviations from a control target value of sampled values of the load variations obtained every predetermined number of times, the controls being immediately effected in an amount of operation corresponding to the deviations when a difference between a value of variation of the sampled values from sampled values obtained a previous time and a value of deviation of the sampled values obtained the previous time from sampled values obtained earlier is greater than a predetermined value.

Thus this invention has achieved controls capable of responding to and following sudden or abrupt load variations in a greatly improved manner without responding to minor load variations or load variations occurring at random.

Other objects and advantages of this invention will be apparent from the following description.

BRIEF DESCRIPTION OF THE DRAWINGS

In the drawings illustrating this invention as embodied.

DETAILED DESCRIPTION OF THE PREFERRED EMBODIMENTS

Figure 1:
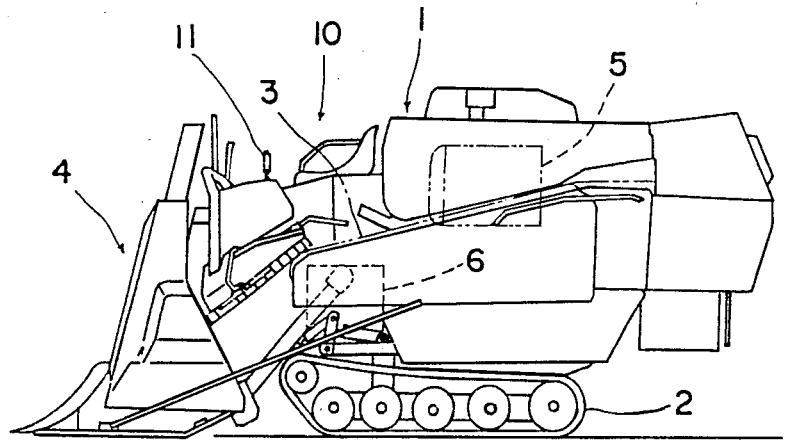
FIG. 1 is a side elevation of a combine harvester.

Referring to FIG. 1, a combine harvester comprises a machine body 1 including crawlers 2, a reaping section 4 to pick up and reap grain-carrying stalks in a field and to transfer the reaped stalks rearwardly while turning the talks to a sideways posture, a feed chain 3 to receive the stalks from the reaping section 4 and pass them on to a thresher 5 where the gains are threshed, classified and stored.

Figure 2:
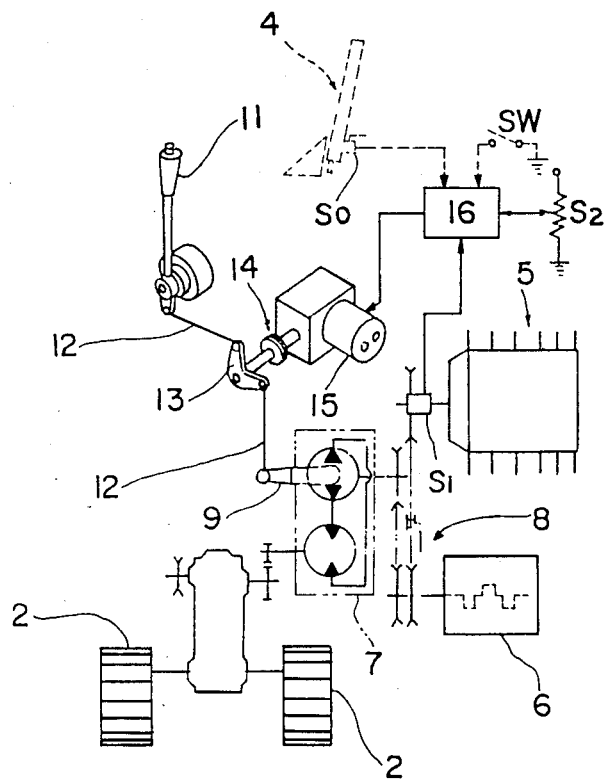
FIG. 2 is a block diagram of a control system.

The crawlers 2 receive power from an engine 6 by way of a hydraulic stepless change speed mechanism 7, as shown in FIG. 2.

The thresher 5 receives power from the engine 6 by means of a belt transmission 8. In order to detect loads acting on the thresher 5, a rotational frequency detecting sensor S1 is operatively connected to a rotary shaft of the thresher 5 to generate a pulse signal proportional to a rotational frequency of the thresher and the engine 6.

The change speed mechanism 7 is shifted by a shifter arm 9 attached thereto and operatively connected through links 12 and a bellcrank 13 to a change speed lever 11 provided at a driver's section 10. The bellcrank 13 is connected to a motor 15 through a frictional transmission device 14 so that the change speed mechanism 7 is automatically shiftable by controlling rotations of the motor 15 by means of a control unit 16 to be described later. A change speed operation may also be effected manually by means of the lever 11 against a frictional force of the frictional transmission device 14 at times of emergency, or when turning the harvester round adjacent ridges in the field.

A control system for controlling traveling speed of the harvester is hereinafter described, which control system is operable to shift the change speed mechanism 7 on the basis of the rotational frequency of the engine 6 detected by the sensor S1.

As shown in FIG. 2, the control system comprises the control unit 16 having a microcomputer as its principal part. The control unit 16 receives signal inputs from the rotational frequency detector sensor S1 and from a potentiometer S2 which acts as means to determine a target load value to be maintained or control target value E0 of the rotational frequency of the engine 6. The control unit 16 puts the motor 15 in forward or reverse rotation to automatically adjust the shift position of the engine speed mechanism 7 in order to maintain detection values En of the sensor S1 within a certain range relative to the control target value E0.

The pulse output by the sensor S1 is repeatedly sampled by a predetermined period of time t, to derive a difference between a pulse number En obtained new and a pulse number obtained in a preceding sampling time, that is to say a variation An in the rotational frequency of the engine, and to derive and store a deviation Dn from the control target value E0.

When the deviation is positive, that is to say the pulse number En is greater than the target value E0, a checking is made to find out whether a deviation Dn−1 derived from the preceding sampling is also positive, that is to say whether the previous deviation Dn−1 is in the same direction. When the previous deviation Dn−1 is positive, an internal counter for counting sampling times W is incremented by "1". When the previous deviation Dn−1 is negative, the counter is reset and the deviation Dn of the current pulse number En is stored as a deviation Dn−1.

When the count value W of the counter reaches a predetermined value Wo, the motor 15 is turned to accelerate the traveling speed of the harvester for a period of time corresponding to an amount of change speed operation G which corresponds to the deviation D. This change speed operation is effected in an amount derived from the amount of operation G corresponding to an average value D of deviations Dn, Dn−1, ..., for the predetermined value Wo, multiplied by the predetermined value Wo. The change speed operation is not carried out when the count value Wo is short of the predetermined value or when the variations in the engine rotation are in different directions. Thus, the system does not respond to load variations occurring at random.

When the deviation Dn of the sampled pulse number En from the target value E0 is negative and the value of variation An is greater than a predetermined value K, that is to say a sudden load increase has taken place, and a difference between the value of variation An and a value of variation An−1 obtained at a preceding sampling time exceeds a predetermined value Kx, the harvester speed is detected immediately by an amount of operation Gn corresponding to the deviation Dn. When the value of variation An is short of the predetermined value K and the difference between the value of variation Dn and the value An−1 obtained the previous time is short of the predetermined value Kx, the direction of the variation is checked as in the case where the deviation Dn is positive, and the deceleration is effected in the amount of operation G corresponding to the average value D of deviations Dn, Dn−1 ... for the predetermined value Wo, multiplied by the predetermined value Wo.

Figure 3:
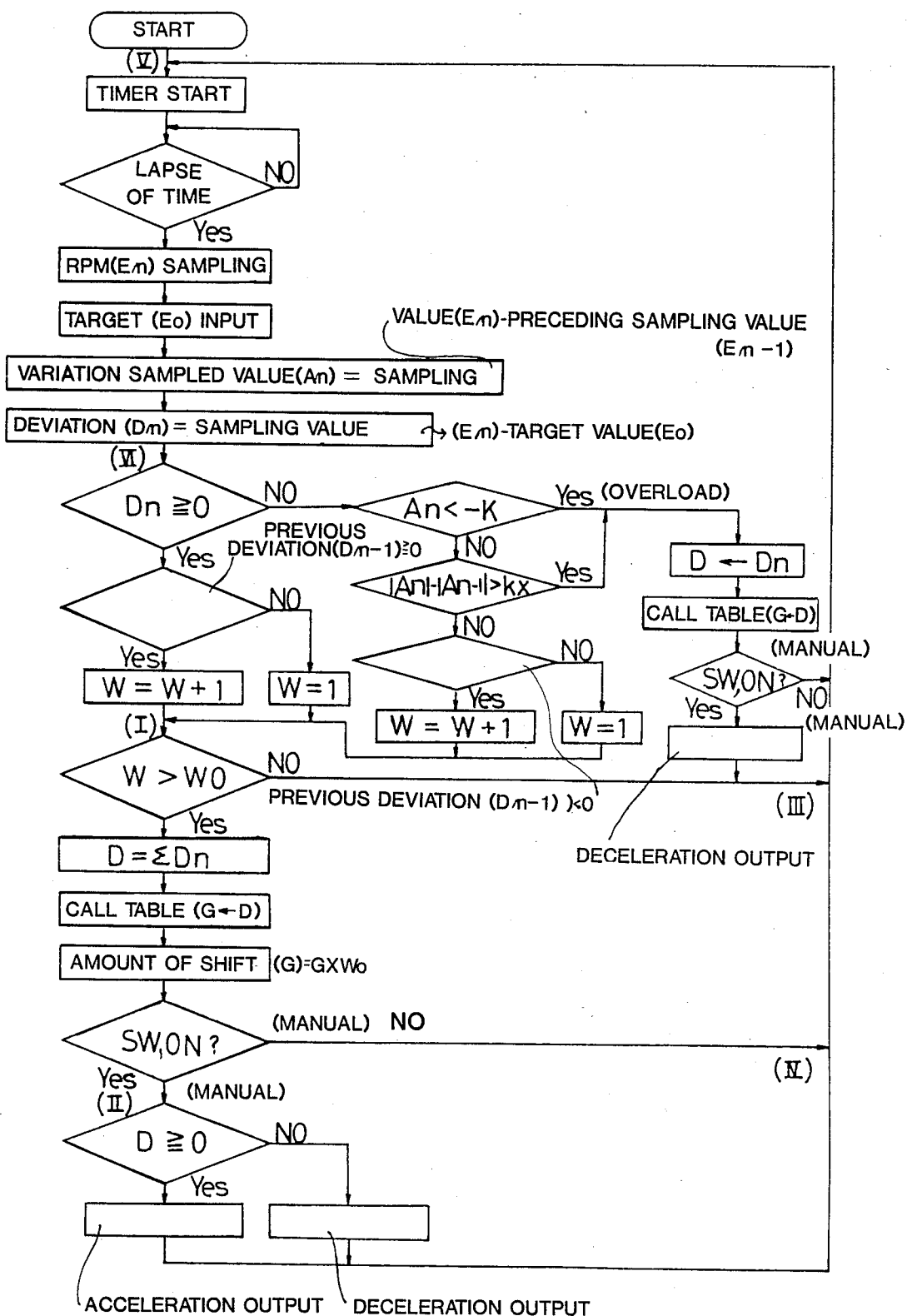
FIG. 3 is a flowchart showing actions of a control unit.
Figure 4:
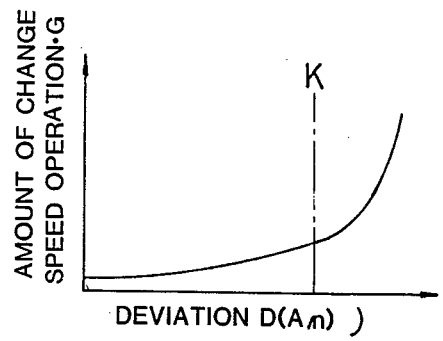
FIG. 4 is a graph showing a relationship between load variations and amounts of change speed operation.

Reference SW as shown in a broken line in FIG. 2 denotes a switch for selecting between the automatic traveling speed control and the manual control. FIG. 3 is a flowchart showing the action of the control unit 16 as described. FIG. 4 is a graph showing the relationship between the deviation D and the amount of change speed operation G.

The relationship between the deviation D and the amount of change speed operation G is tabled and stored in advance in a memory (not shown) provided in the control unit 16.

Furthermore, the amount of change speed operation G may be made to correspond to the value An of variation in the rotational frequency or the sampled value En instead of the variation D.

While only the rotational frequency En of the engine is used as the control parameter in the described embodiment, other parameters may be utilized. For example, necessary data for the controls may be derived from traveling speeds of the harvester or from varied operational conditions such as of the thresher and a threshed straw threating unit.

Further, while a traveling speed decelerating operation is immediately carried out when the value of deviation An is greater than the predetermined value K, that is when a sudden load increase takes place, as described, it is also possible to arrange that an accelerating operation is carried out when the load decreases.

The control system of FIG. 2 may be added with the following function: To be particular, a stalk sensor S0 may be provided as shown by a broken line in a top portion of FIG. 2. This sensor S0 is for detecting presence (and absence) of stalks to be introduced into the reaping section 4 to determine the beginning and end of a reaping operation. The stalk sensor S0 may comprises an on-off switch operable by contact with stalks, that is to say a contact sensor.

A description will be made hereinafter of a harvester traveling speed control system operable to control shift positions of the change speed mechanism 7 on the basis of detections by the stalk sensor S0 of the beginning and end of a reaping operation and detections by the rotational frequency detecting sensor S1 of the rotational frequency of the engine 6.

When the engine 6 is started, the rotational frequency En of the engine 6, which serves as a control parameter, is repeatedly detected by the sensor S1 by a predetermined cycle time t, regardless of whether controls are effected automatically or manually and whether a reaping operation is in progress or not.

Then, a signal coming from the stalk sensor S0 is checked. Until the stalk sensor S0 turns on, that is to say until a reaping operation begins, only the rotational frequency En of the engine is detected by the sensor S1 and an AL processing to generate a control signal for operating the change speed mechanism 7 is not carried out.

Further, an on-off position of the automatic switch SW is checked which switch SW acts to determine whether the start or stop of automatic controls, namely the machine operation, should be effected automatically or manually. The change speed mechanism 7 is not automatically shifted until the switch SW turns on.

Figure 5:
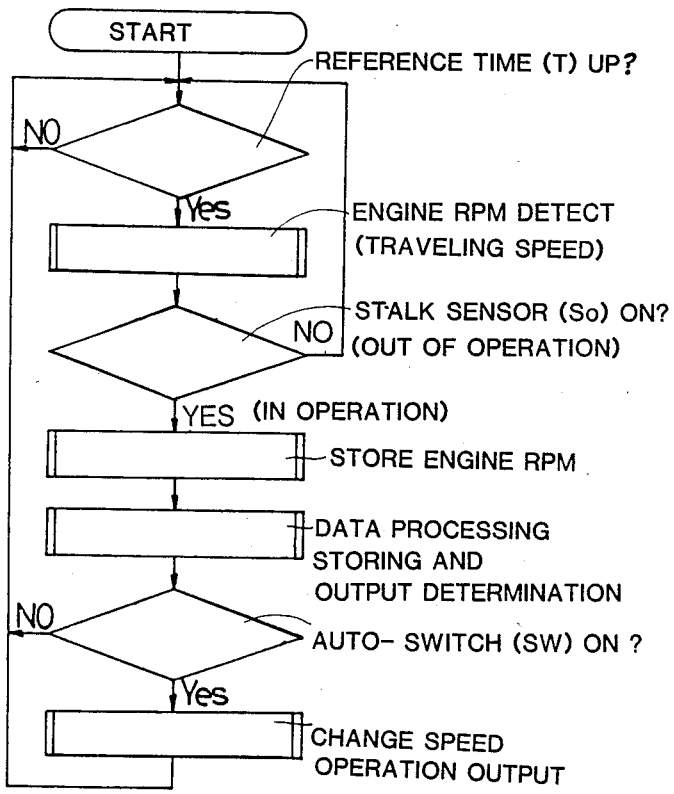
FIG. 5 is a flowchart showing the function of the control unit.

FIG. 5 is a flowchart showing the actions of the control unit 16 as described above.

The beginning and end of the reaping operation may be detected not only by the stalk sensor S0 but also by means of detections of the working conditions of the stalk processing apparatus.

The additional function as described above has the advantage that, though data providing basis for the automatic controls are obtained before switching to the automatic control mode by the switch SW, there is no possibility of confusion arising at times of the switching.

Figure 6:
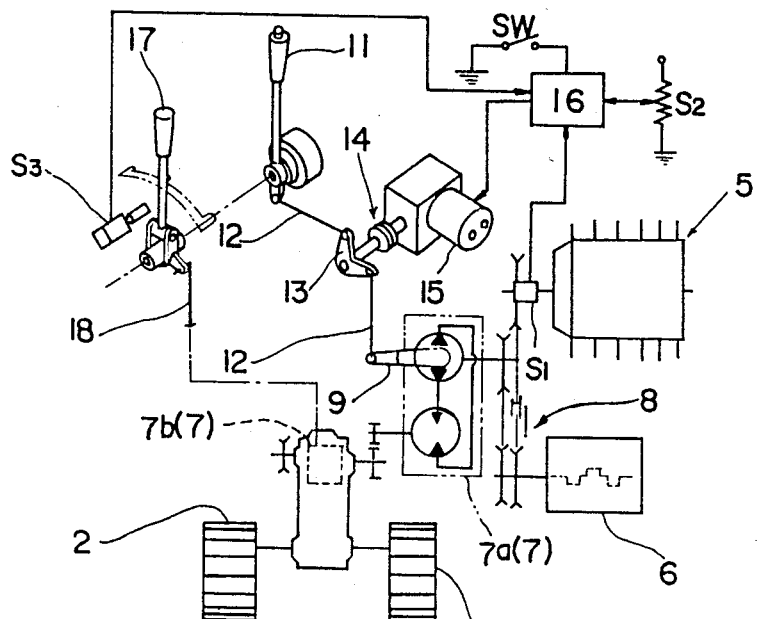
FIG. 6 is a block diagram of a modified control system.
Figure 7:
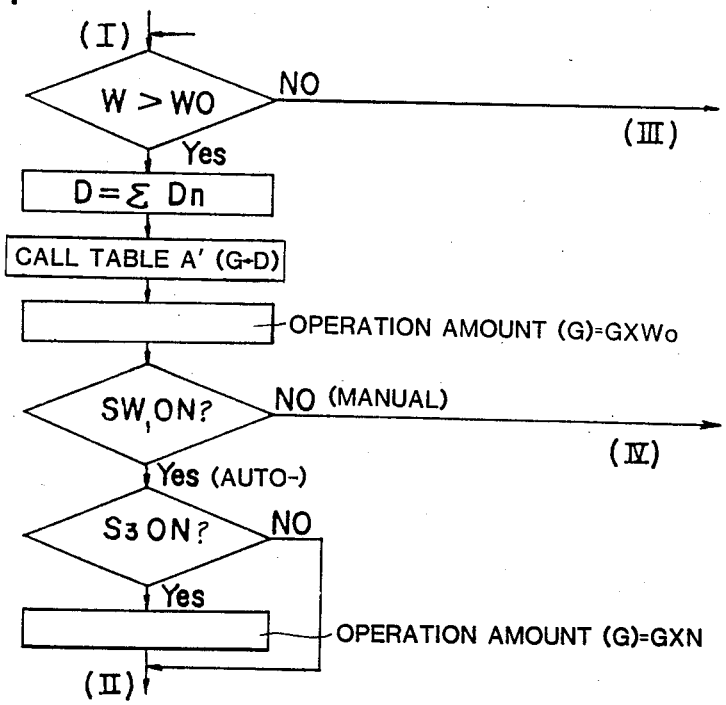
FIG. 7 is a flowchart part showing actions of a control unit in the modified control system.

Next, reference is made to FIGS. 6 and 7 showing a modification of the embodiments thus far described referring to FIGS. 1 through 4 and FIGS. 1 through 5.

This modified embodiment comprises, in addition to a main change speed mechanism 7a which corresponds to the described change speed mechanism 7, an auxiliary change speed mechanism 7b and a hand lever 17 connected thereto by a wire or the like 18. This embodiment further comprises a sensor such as a limit switch S3 operable to detect a shift position of the auxiliary change speed mechanism 7b on the basis of a position of the lever 17. An on-off signal of the switch S3 is given to the control unit 16.

When the auxiliary change speed mechanism 7b is operated for reaping stalks, which turns the switch S3 on, the main change speed mechanism 7a is automatically shifted to an extent corresponding to a reduction ratio N provided by the auxiliary change speed mechanism 7b. That is to say data processing is performed by the control unit 16 as shown in FIG. 7. The flowchart of FIG. 7 is different from the flowchart of FIG. 3 in steps between the two steps "W>Wo" and "SW ON?".

Since an AL processing $G = N \times G$ is carried out, the relationship between a detected deviation Dn and the amount of operation G of the main change speed mechanism 7a will never be inadvertently disturbed. In this way it is determined whether a slowdown in the harvester's traveling speed is due to a load increase or to an operation of the auxiliary change speed mechanism 7b, on the basis of which the control unit 16 outputs an optimal control signal at all times.

Figure 8:
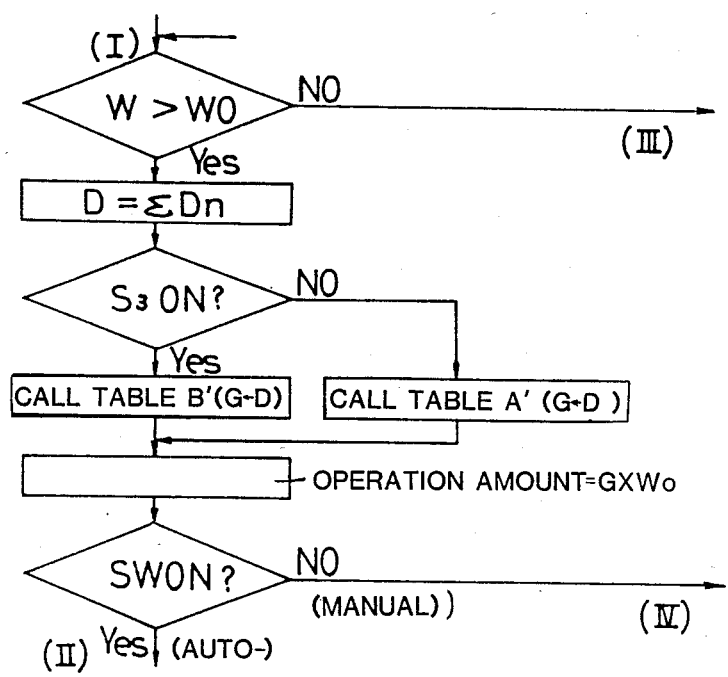
FIG. 8 is a flowchart part showing slightly modified actions of the control unit in the control system of FIG. 6.

The same effect as above may be produced when a slight alteration is made to the internal structure and action of the control unit 16 in FIG. 6. FIG. 8 shows an example of such an alteration. The flow of control action in this instance is on the whole similar to that of FIG. 7 but is different in details. The difference lies in two data tables A' and B' provided to determine the amount of change speed operation G in response to the on-off position of the limit switch S3 which detects whether the auxiliary change speed mechanism 7b is operated. The table A' corresponds to what is shown in FIG. 7, whereas the table B' is a new addition. The table B' is stored with an amount of change speed operation, after varying it, corresponding to the change speed ratio N of the auxiliary change speed mechanism 7b. As seen in FIG. 8, the amount of change speed operation for the main change speed mechanism 7a is given by the table A' when the auxiliary change speed mechanism 7b is not operated and by the table B' when the auxiliary change speed mechanism 7b is operated. Thus, the relationship between the detected deviation Dn and the amount of change speed operation G is not disturbed by the operation of the auxiliary change speed mechanism 7b.

Figure 9:
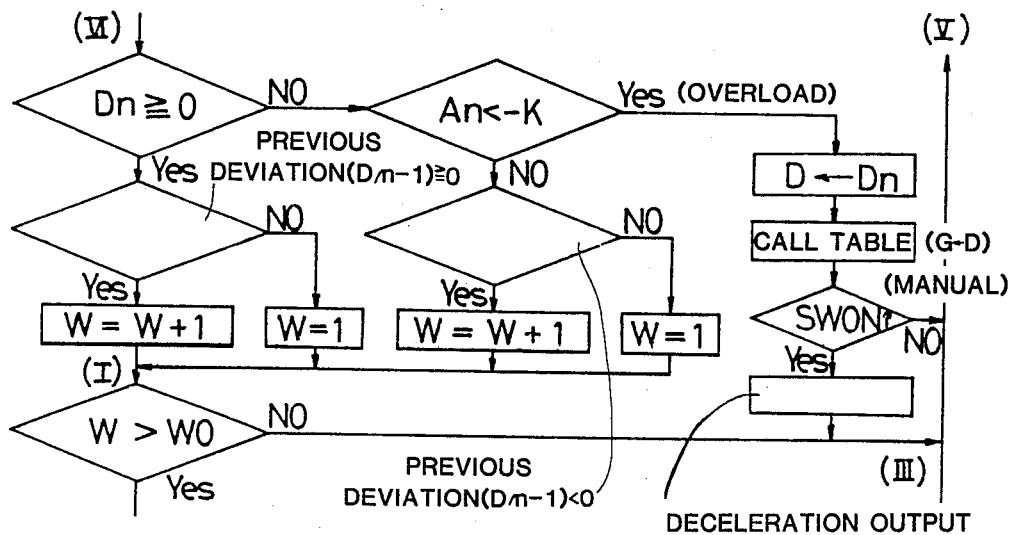
FIG. 9 is a flowchart part showing a further modified control system, particularly actions of a control unit used therein.
Figure 10:
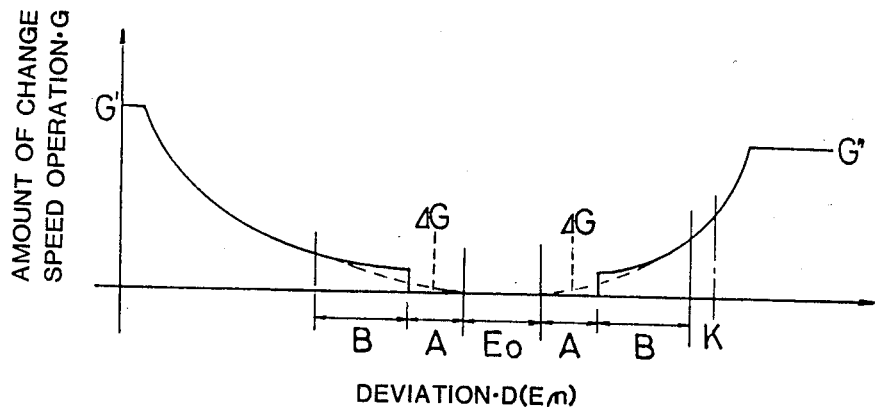
FIG. 10 is a graph showing a relationship between load variations and amounts of change speed operation according to the further modified control system.

FIGS. 9 and 10 show another modification of the embodiment of FIGS. 1 through 4 or FIGS. 1 through 5. This modification includes slightly altered steps between the step "Dn≧0" and the step "W>Wo" compared with the data processing of FIG. 3 to be performed by the control unit 16.

The relationship between the deviation D and the amount of change speed operation G is tabled and stored in advance in a memory (not shown) provided in the control unit 16, as already described. This modification has a characteristic feature in the relationship between the deviation D and the amount of change speed operation G. As shown in FIG. 10, insensitivity zones A are provided adjacent the target value E0 for the actuator for operating the change speed mechanism 7 including the motor 15. In regions B adjacent the insensitivity zones A the amount of change speed operation corresponding to the deviation D is increased by an amount corresponding to the amount ΔG for the insensitivity zones A. By effecting controls in the increased amount, an actual rotation frequency En of the engine is brought into agreement with the control target value E0 with high precision. In order to avoid a danger arising from a sudden acceleration or deceleration which would result from an excessive amount of change speed operation G when the deviation D is large, an upper limit may be set for the amount of change speed operation G to permit the change speed operation to be effected in a constant amount G', G" when the deviation D is large.

Since, according to this modification, change speed controls are effected in the amount increased by an amount corresponding to the insensitivity zones adjacent to these insensitivity zones of the actuator for shifting the change speed mechanism, as described, the actuator operation adjacent the insensitivity zones is effected with increased reliability and accessibility to the control target value is greatly improved. Further, since change speed controls are effected with an increased amount corresponding to the insensitivity zones of the actuator adjacent the insensitivity zones, control insensitivity zones, that is to say tolerance ranges relative to the control target value may be allowed to be broader than the insensitivity zones of the actuator per se without hampering the accessibility of the controls to the target value. This helps to decrease operational frequency of the actuator adjacent the control target value, thereby greatly extending a period of use of the control mechanism.

Figure 11:
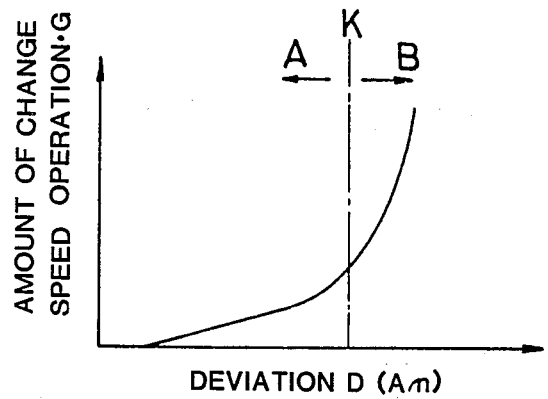
FIG. 11 is a graph showing a relationship between load variations and amounts of change speed operation according to a still further modified control system.
Figure 12:
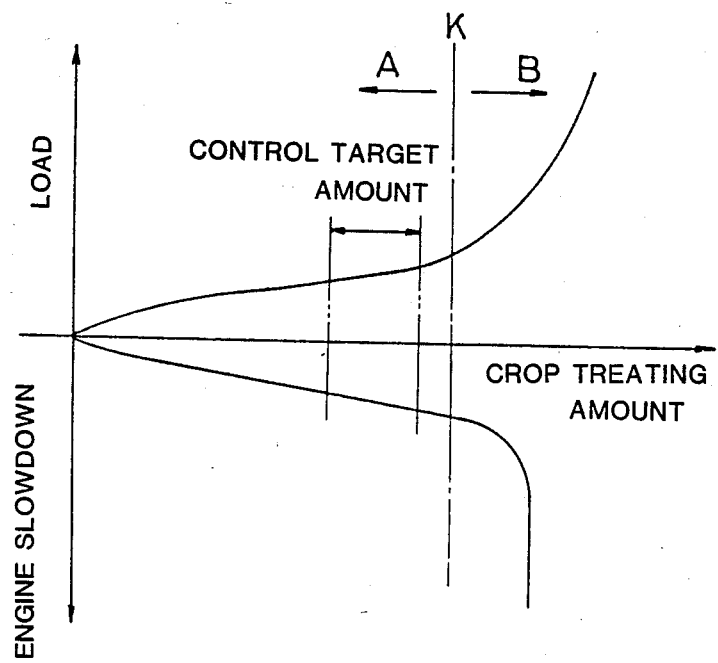
FIG. 12 is a graph showing a relationship among the load variations, amounts of stalk treatment, and engine speed according to the still further modified control system.

A further modification is shown in FIGS. 9, 11 and 12. In particular this modification consists in a change made to the data processing by the control unit 16 having regard to the fact that the load is not proportional to the stalk treating amount as shown in FIG. 12.

It has been confirmed through varied tests that, as shown in FIG. 12, there are a light load range A where the actual amount of stalks treated by the thresher, that is a load variation for the engine, is in propertional relationship with an amount of reaped stalks, and an excessive load range B where the load changes suddenly. Therefore, controls simply based on the proportional relationship between the detected load variations and the amount of change speed operation is incapable of adequately coping with the situation in the excess load range B. In some cases inconveniences such as an engine failure and the thresher getting choked with stalks take place because of the inadequate following by the controls of the load variations.

In order to improve such a situation too, the steps between the two steps "Dn≧0" and "W>Wo" are changed as shown in FIG. 9. Further, the relationship between the deviation D and the amount of change speed operation to be stored in the memory in advance is changed as in FIG. 11 from what it is in FIG. 4, that is the amount of change speed operation G is made to rise sharply. When the deviation Dn of a sampled value En from the target value E0 is negative, that is to say when the load is on the increase, an extent of its variation An is checked. When the deviation exceeds the predetermined value K, that is when a sudden increase in the load takes place as in the range B of FIG. 11, a decelerating operation is immediately effected in an amount corresponding to the deviation Dn. When the variation An is below the predetermined value K, that is when the load variation is slight as in the range A of FIG. 11, the direction of the variation is checked as in the case where the deviation Dn is positive, and a decelerating operation is effected in an amount corresponding to an average value D of the deviations Dn, Dn−1 . . . for the predetermined number of sampling times Wo, multiplied by the number Wo.

Thus, this modification has the advantage of expediting the controls in the excess load range B thereby to prevent the combine harvester from becoming inoperative and to maintain an efficient operation thereof.

Figure 13:
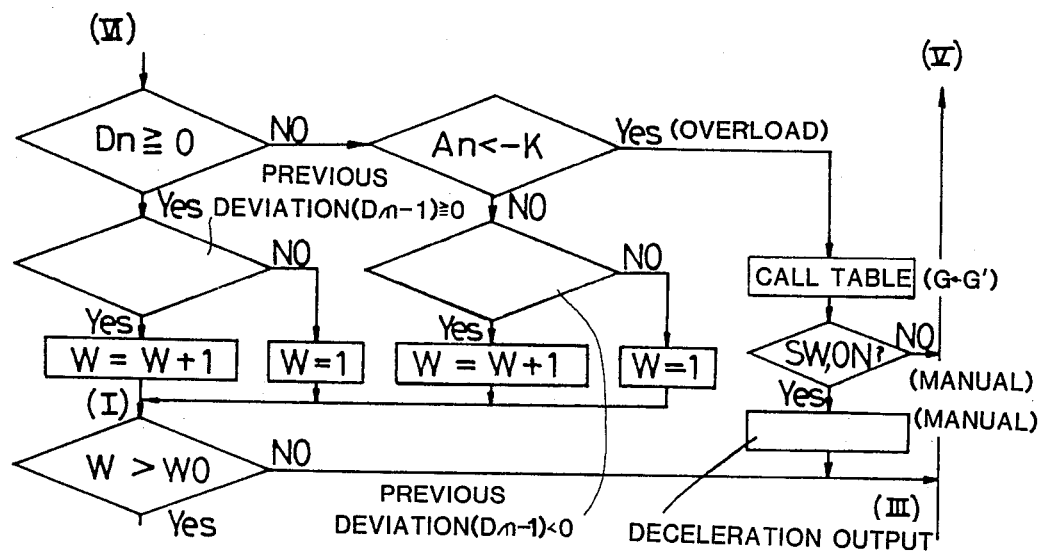
FIG. 13 is a flowchart part showing a modified embodiment different from the foregoing embodiments, particularly actions of a control unit used therein.
Figure 14:
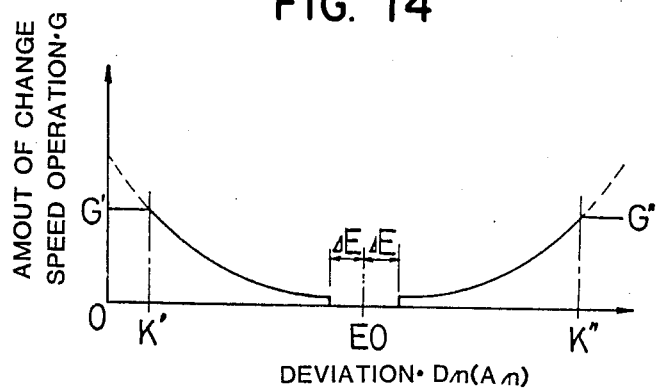
FIG. 14 is a graph showing a relationship between load variations and amounts of change speed operation according to the embodiment of FIG. 13.
Figure 15:
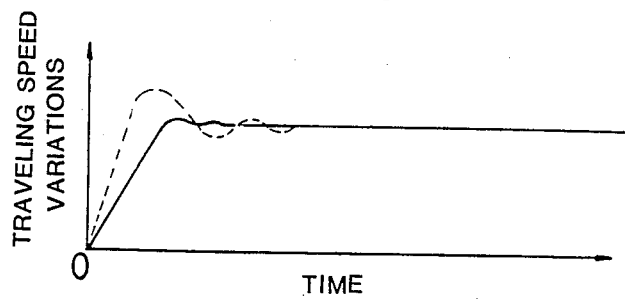
FIG. 15 is a graph showing variations in harvester traveling speed.

FIGS. 13 through 15 show a still further medification which solves a problem of the prior art indicated by a dotted line in FIG. 15. More particularly, at the beginning of a reaping operation there occurs a sudden change from a nil load condition to a condition having a certain amount of load, and the traveling speed undergoes a sudden change if controls are effected at this time as in the case of coping with load variations which take place during the reaping operation. This not only causes an overshoot in the change in the traveling speed but gives a sense of insecurity to the driver. Similarly, when the reaping operation comes to a break or an end, a sudden load variation takes place bringing a sudden change to the traveling speed.

FIG. 13 shows a change made, in accordance with this modification, to the steps between the two steps "Dn≧0" and "W>Wo" in the processing shown in the flow-chart of FIG. 3 which is performed by the control unit 16. Further, FIG. 14 shows a specialized relationship between the deviation D and the amount of change speed operation to be stored in the memory in advance.

According to this arrangement, when the deviation Dn of a sampled value En from the target value E0 is negative, an extent of its variation An is checked. When the deviation is greater than a predetermined value K', that is when a sudden increase in the load has taken place, a decelerating operation is immediately effected in a predetermined amount G'. When the variation An is below the predetermined value K', the direction of the variation is checked as in the case where the deviation Dn is positive, and a decelerating operation is effected in an average value D of deviations Dn, Dn−1 . . . for the predetermined number of sampling times Wo, multiplied by the number Wo.

Therefore, as shown in FIG. 15, although in the prior art a great load variation brings about a sudden change to the traveling speed involving an overshoot as shown by a dotted line in the drawing, it is now possible to change the traveling speed without an overshoot as shown in a solid line.

Dotted line portions in FIG. 14 indicate changes in the amount of change speed operation in traveling speed controls according to the prior art, and reference ΔE denotes tolerances.

Furthermore, the arrangement for effecting a change speed operation in the predetermined amount G' when the detected variation An exceeds the predetermined value K' is not limited to the case of deceleration but is applicable to an accelerating operation as shown at G" in FIG. 14 which is effected at or above a predetermined value K".

I claim:

1. A combine harvester driven by an engine through speed-changing means comprising:
sensor means for generating load pulses indicative of load on said engine;
processing means for periodically determining a load value (En) from said load pulses and for determining and storing a deviation value (Dn) which is a function of a difference between said load value (En) and a preset load value (Eo) and a load variation (An) which is a function of a difference between two successive load values (En−1), (En);

counter means which advances when deviation values of the same sign are successively stored and which resets when a deviation value of an opposite sign is stored and which generates a signal after a count reaches a predetermined number (Wo);

averaging means responsive to said signal for providing an average deviation value (D) of said predetermined number (Wo) of deviation values and for generating a first control command;

OR means in response to a negative deviation value for generating a second control command and resetting said counter means when said negative deviation value is less than a lower threshold value (−K) or when the difference in magnitude between two successively stored load variations (An−1), (An) is greater than a predetermined value (Kx);

control means for operating said speed-changing means on the basis of said average deviation value (D) when a first control command is received from said averaging means, and on a basis of said negative deviation value when a second control command is received from said OR means.

2. A combine harvester as claimed in claim 1 wherein said control means includes prestored values of deviation (D) and an amount of operation (G), and said control means determines from said stored values an amount of operation (Gn) corresponding to said negative deviation as well as for said average deviation values.

3. A combine harvester as claimed in claim 2 further comprising means for detecting a beginning of a reaping operation and for generating a start signal, and said control means is responsive to said start signal for permitting said processing means to start operating.

4. A combine harvester as claimed in 3 further comprising switching means switchable between an automatic mode for operating said control means and a manual mode for stopping the operation of said control means.

5. A combine harvester as claimed in 4 wherein said speed-changing means includes a main change speed mechanism controllably operated by said control means and an auxiliary change speed mechanism operatively connected thereto, said auxiliary change speed mechanism including a shift control operable by an operator.

6. A combine harvester as claimed in 5 further comprising means for detecting shift operation on said auxiliary change speed mechanism and for generating a signal, and said control means includes a compensation means responsive to said signal for compensating an amount of operation determined from said stored values on the basis of speed change ratio (N) given to said auxiliary change speed mechanism whereby said main change speed mechanism is operated by said compensated amount of operation.

* * * * *